(12) United States Patent
Nelson

(10) Patent No.: US 12,370,848 B2
(45) Date of Patent: Jul. 29, 2025

(54) COUPLING APPARATUS FOR TOWING

(71) Applicant: Dethmers Manufacturing Company, Boyden, IA (US)

(72) Inventor: Jeremiah Nelson, Hull, IA (US)

( * ) Notice: Subject to any disclaimer, the term of this patent is extended or adjusted under 35 U.S.C. 154(b) by 454 days.

(21) Appl. No.: 17/896,149

(22) Filed: Aug. 26, 2022

(65) Prior Publication Data

US 2023/0127867 A1 Apr. 27, 2023

Related U.S. Application Data

(60) Provisional application No. 63/237,302, filed on Aug. 26, 2021.

(51) Int. Cl.
*B60D 1/52* (2006.01)
*B60D 1/06* (2006.01)

(52) U.S. Cl.
CPC ...... *B60D 1/52* (2013.01); *B60D 1/06* (2013.01)

(58) Field of Classification Search
CPC ........................................................ B60D 1/06
See application file for complete search history.

(56) References Cited

U.S. PATENT DOCUMENTS

| | | | | |
|---|---|---|---|---|
| 6,024,372 A | * | 2/2000 | Colibert | B60D 1/06 280/901 |
| 6,540,246 B2 | * | 4/2003 | Andersen | B60D 1/065 280/417.1 |
| 6,808,195 B2 | * | 10/2004 | Smith | B62D 53/0828 280/417.1 |
| 8,783,706 B2 | * | 7/2014 | Drake | B60D 1/06 280/441.2 |
| 2025/0001817 A1 | * | 1/2025 | Anderson | B60D 1/06 |

* cited by examiner

*Primary Examiner* — Kevin Hurley
(74) *Attorney, Agent, or Firm* — Brick Gentry PC; Brian J. Laurenzo; Charles E. Forney

(57) ABSTRACT

An coupling apparatus for towing is provided which in some embodiments may be a ball hitch coupler configured to accept a ball hitch which is attached to a towing vehicle. The apparatus may include one or more projections that may be flat-topped with rounded corners and separated by valleys having a tapered profile. This configuration reduces and transfers stress away from the connection point of a mounting section, such as a removable tube which is then attached the towed vehicle. The apparatus may be sized and shaped so as to accept a multitude of different styled and shaped mounting sections. The projections sit atop a flange that may be configured to reduce the compression load on the apparatus. The apparatus may utilize a clamping force style fastener to be used to attach the mounting section to the apparatus, providing for maximum versatility of said apparatus.

17 Claims, 7 Drawing Sheets

COUPLING APPARATUS FOR TOWING

CROSS REFERENCE TO RELATED APPLICATIONS

This application claims priority from U.S. Provisional Patent Application Ser. No. 63/237,302 filed Aug. 26, 2021 and entitled Ball Hitch Coupler. The contents of U.S. Provisional Patent Application Ser. No. 63/237,302 is hereby incorporated in its entirety by reference.

FIELD OF THE INVENTION

This invention relates generally to coupling mechanisms, and more specifically, ball hitch clamp style couplers that may be attached to a towed vehicle to engage ball hitches which are attached to a towing vehicle.

BACKGROUND

Ball and socket type couplers are commonly used to couple a towed vehicle to a towing vehicle. In most configurations, the towing vehicle will include a ball hitch located somewhere on the rear of the towing vehicle which is rigidly affixed to the frame of a towing vehicle. The vehicle to be towed includes a connection to a coupler housing that includes a socket for engaging the ball hitch which is attached to a towing vehicle. A latching mechanism is associated with the coupler to retain the ball within the socket during towing. The latching mechanism also allows the housing to release the ball from the socket.

Commonly, the latching mechanism will include a handle, or lever, which can be adjusted between an open position that permits the ball to be inserted and removed from the socket and a closed a position that retains the ball within the socket of the coupler. Typically, a user must adjust the lever to the open position in order to place the socket in engagement with the ball.

U.S. Pat. No. 7,690,673 discloses a Self-Latching Ball Clamp Coupler. The entire disclosure of U.S. Pat. No. 7,690,673 is hereby incorporated by reference. The ball hitch coupler includes a housing with a generally downwardly facing open socket for receiving a ball hitch. A ball clamp member within the open socket is attached to an adjustment lever by a clamp rod that extends through a top surface of the housing. A camming surface provided on the lever causes the clamp rod to pull the ball clamp member upwardly and outwardly from the socket as the lever is pivoted to an open position thereby releasing the ball hitch. When the lever is in a neutral ready position, a ball hitch may be inserted into the socket and will automatically be coupled with the ball hitch coupler without further adjustment.

Moreover, ball hitch couplers must be securely connected to the towing vehicle and/or towed vehicle (typically the towed vehicle) to which they are attached for towing. Connections between ball hitch couplers and towed vehicles often take the form of a tube or a pin box that runs between and is connected in some fashion to the remainder of the frame of the towed vehicle and the coupler. The tube or pin box may take on various shapes and sizes. For example, the tube or pin box may have a square cross-section or a circular cross-section. Moreover, the tube or pin box may vary in height depending on the application. In the past, these connecting tubes or pin boxes have been directly welded to ball hitch couplers, which was necessary to create sufficient strength to effectively carry out the towing task. However, this direct welded configuration requires numerous models of ball hitch couplers to be manufactured and for retail outlets to stock all or nearly all of those numerous different models of couplers with various connecting tubes or pin boxes attached.

Needed in the art is an improved ball hitch coupler resulting in an improved connection between the ball hitch coupler and the tube affixed to the towed vehicle that allows for increased versatility.

SUMMARY

Accordingly, an apparatus is provided wherein in some embodiments a coupler for connecting a towing vehicle to a towed vehicle accepts a wide array of mounting sections, such as tubes or pin boxes, is provided. The mounting sections may have one of a plurality of cross-sectional shapes. This results in different configurations that may be freely interchanged by securing the differently shaped or sized mounting sections to the ball hitch coupler with removably attachable fasteners, rather than those of the prior art which are permanently welded.

Provided are embodiments of a ball hitch coupler wherein the coupler is releasably attached to the mounting section, wherein the mounting section is in turn secured to the vehicle to be towed. The ball hitch coupler of the present invention includes a first end upon which a plurality of projections, each having fastening locations, are present. The previously described projections are configured to be attached to the mounting section of the towed vehicle. The projections may be configured to form a friction contact area with the inner surface of said mounting section. The mounting section may be removable from the projections by removing the removably attachable fasteners. A second end of the coupler may include a hitch portion, such as one that may be latched to a ball hitch.

In some embodiments, the mounting section cross-section is circular, and in other embodiments the cross-section is square. In some embodiments the mounting section is a is a towed vehicle tube connection, while in others it is a pin box.

The previously described projections may have rounded top corners and flat tops. The previously described projections also have valley spaces therebetween. The valley spaces may be arcuate in shape, such as saddle-shaped. The valleys may taper toward the top. The projections each include a fastening position, whereby fasteners may exert a clamping force between said projections and said mounting section. Further, the removable mounting section's bottom edge may sit on a flange that is integrated into the coupler apparatus which flange supports the removable mounting section and eliminates compression movement about the coupler apparatus regarding the removable mounting section.

DETAILED DESCRIPTION

Provided is an apparatus 100 for coupling a towing vehicle to a towed vehicle. The apparatus 100 may be a coupler and/or may be configured with several types of couplers known in the art. In the preferred embodiment, the apparatus 100 has a first end 103 for attachment to a mounting section of a vehicle to be towed and a second end 102 including a hitch. In the preferred, illustrated embodiments, the second end 102 is a ball hitch coupler. However, it will be understood by a person of skill in the art that the apparatus may include, or be used with, other types of couplers with departing from the scope of the invention.

Figure 1:
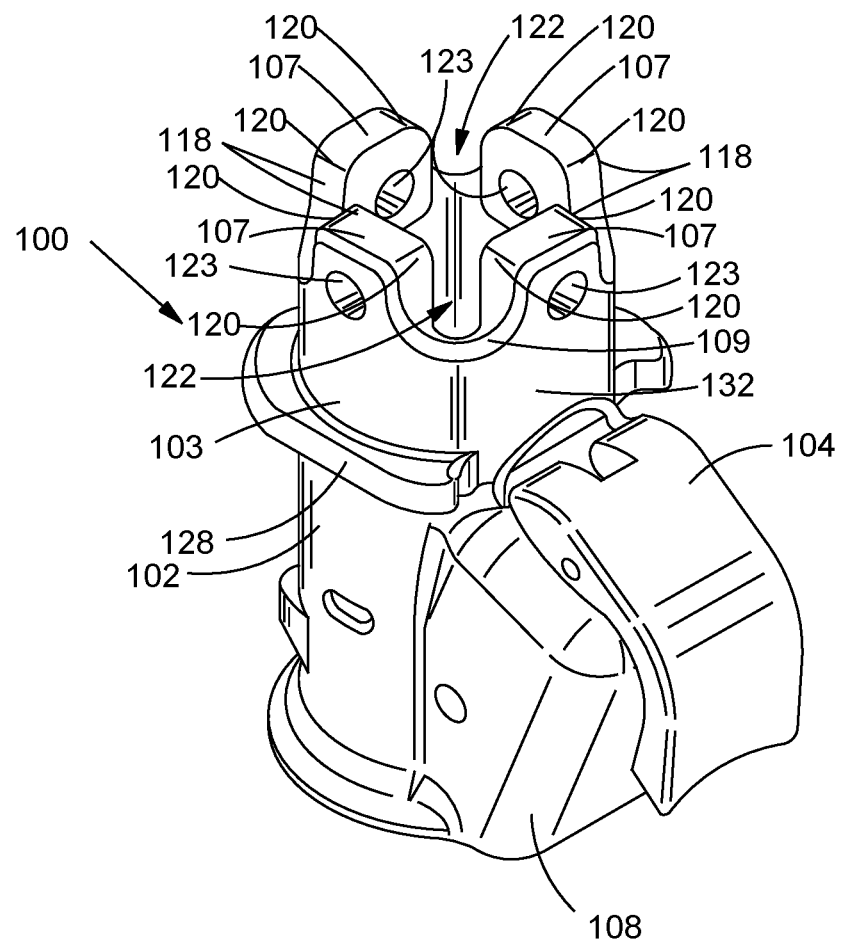
FIG. 1 is a perspective view of a ball hitch coupler of the present invention.
Figure 2:
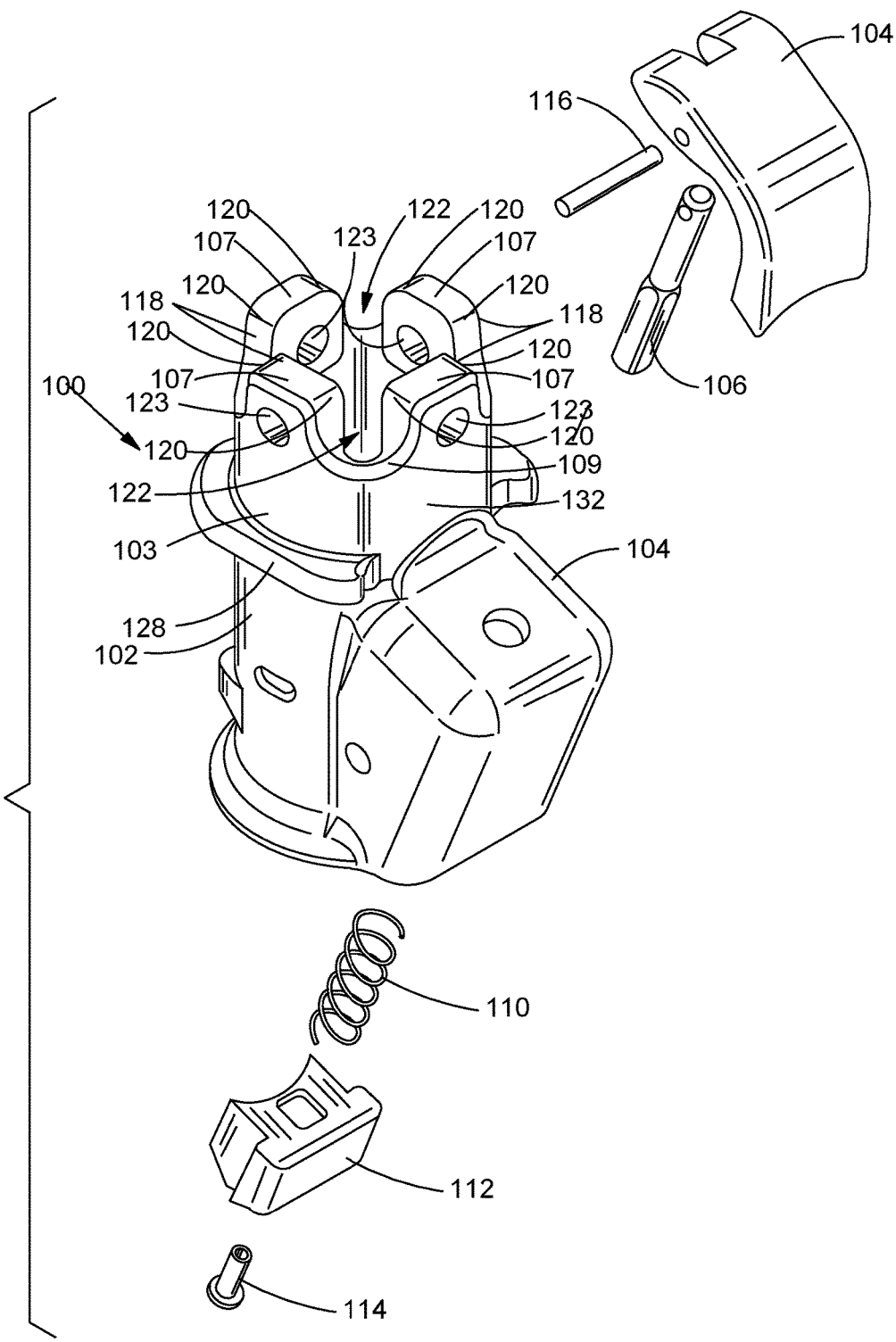
FIG. 2 is an exploded perspective view of the ball hitch coupler of FIG. 1.
Figure 8:
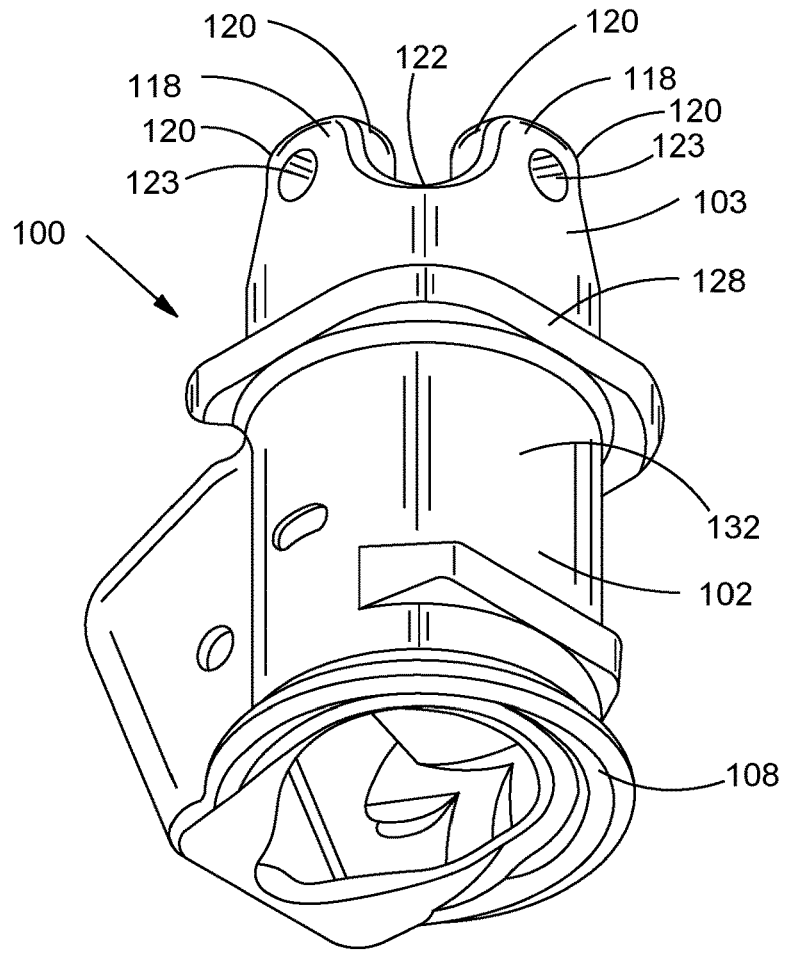
FIG. 8 is a perspective view of the ball hitch coupler of FIG. 1 from a different angle.

Referring to FIGS. 1, 2, and 8, the apparatus 100 is shown. The apparatus 100 includes a first end 103 and a second end 102. The second end 102 may include a hitch portion. The hitch portion may be a coupler for connecting a towing vehicle to a vehicle to be towed, such as a trailer. In preferred embodiments, the hitch portion is a ball hitch coupler. Accordingly, referring to FIG. 2, the second end may include a latch 104, clamp stem 106, latch housing 108, biasing member 110, ball hitch clamp 112, a means (illustrated as a screw) 114 to attach the ball hitch clamp 112 and the biasing member 110 to the clamp stem 106, and a pin 116 which connects the latch 104 to the clamp stem 106.

Figure 4:
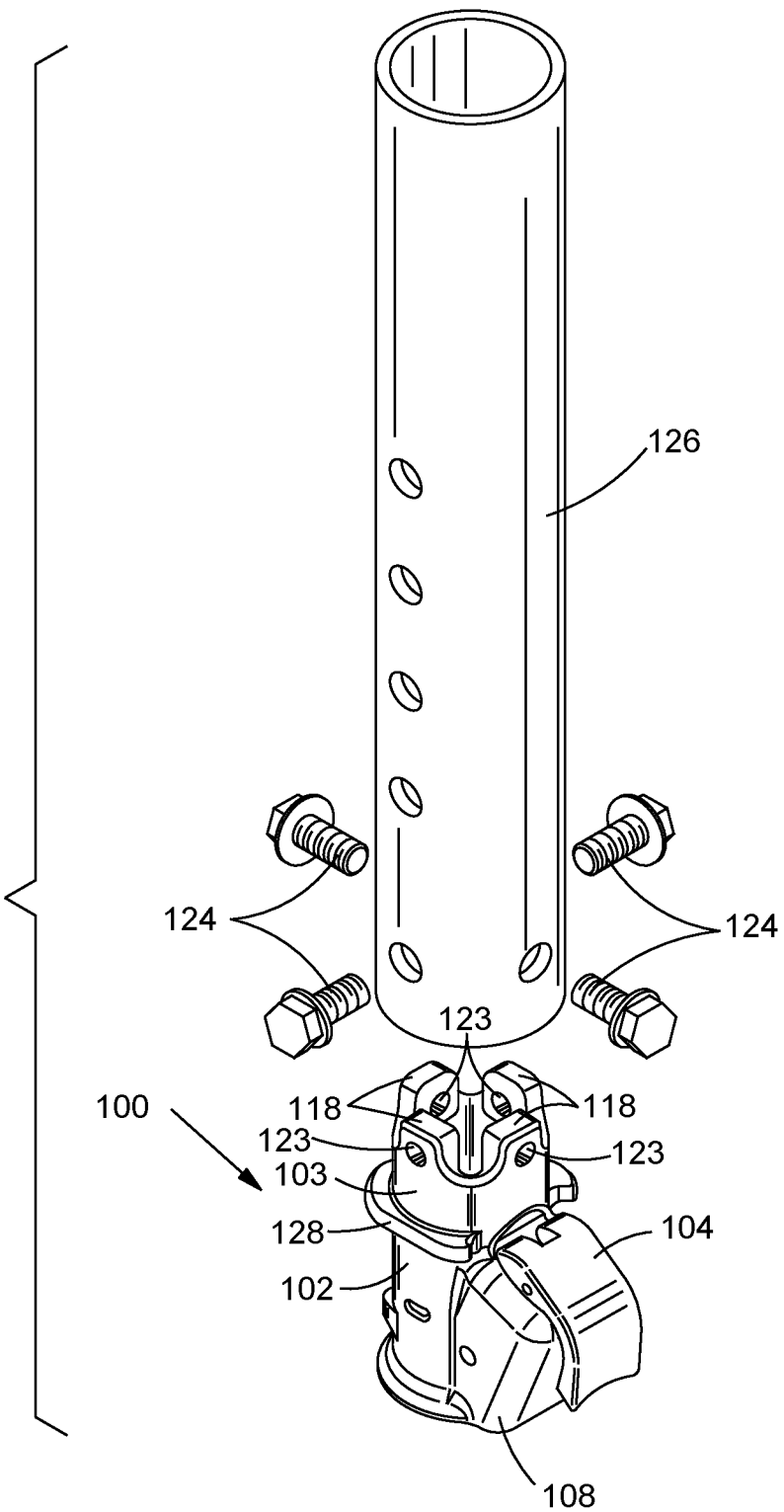
FIG. 4 is an exploded perspective view of a ball hitch coupler of the present invention attached to a mounting section have a circular cross-section.
Figure 5:
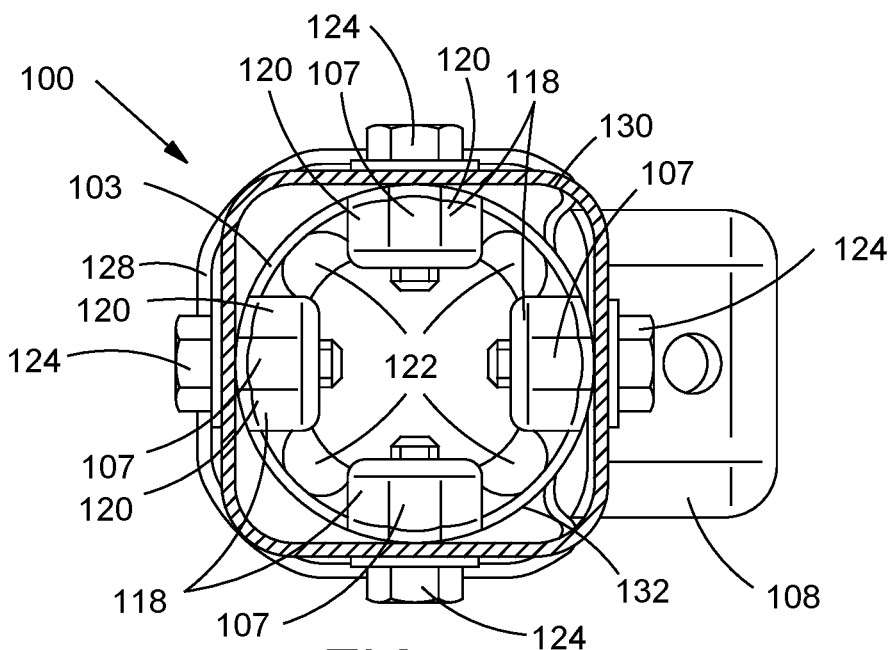
FIG. 5 is a plan view from the top of the ball hitch coupler of the present invention attached to a removable mounting section having a square cross-section which utilizes clamping style fasteners.
Figure 6:
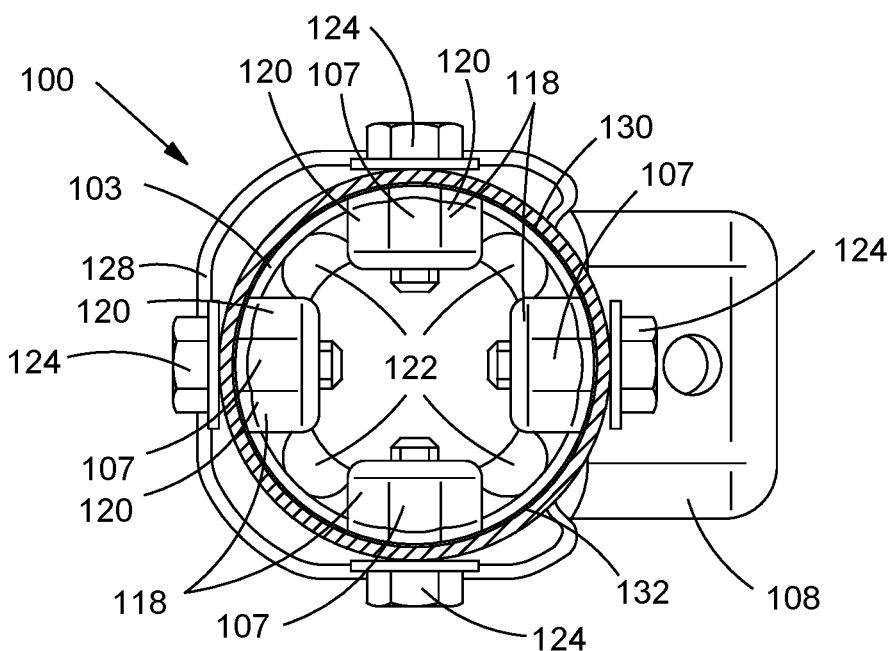
FIG. 6 is a plan view from the top of the ball hitch coupler of the present invention attached to a removable mounting section having a circular cross-section which utilizes clamping style fasteners.

Referring again to FIGS. 1, 2, and 8, the first end 103 may include one or more projections 118. The projections 118 may have a flat top 107, chamfered outside top edge 109, and rounded corners 120. The projections 118 may also include one or more fastening positions 123. The fastening positions 123 may include an aperture to accept a fastener 124. The aperture may have increased material around it that enables proper engagement for accepting the fastener 124. In the illustrated embodiment wherein the fastener is a bolt, the increased material enables proper thread engagement. Indeed, as shown in FIGS. 4 and 6, the fastener may be a bolt, such as a threaded bolt, or other clamping force style fastener. The projections 118 may be configured to form a friction contact area with the interior surface 130 of a mounting section 126, which is shown in FIGS. 5 and 6. In some preferred embodiments, the entire exterior surface of the projections 118 may contact the mounting section 126, therefore creating a friction contact area that is the entire exterior surface of the projections 118. This may exclude the chamfered outside top edge 109 in some embodiments. In other embodiments, the friction contact area may be a portion of the exterior surface of the projections 118.

Referring to FIGS. 3-6, embodiments of mounting sections 126 are shown. As in known in the art, hitches, such as ball hitch couplers must be attached to either a towing vehicle or vehicle to be towed. As noted above, oftentimes a ball hitch coupler is attached to a vehicle to be towed, such as a trailer, whereas the ball is attached to the towing vehicle. Typically, the ball hitch coupler is attached to a tube which is in turn attached to the vehicle to be towed. The tube can be any shape or size. Most often, the tube has either a circular or square cross-section. The square cross-section may have rounded corners. The tube may be any length required for a particular application. Accordingly, in many embodiments of the present invention, the mounting section 126 is a tube. The mounting section 126 is shown having a square cross-section tube in FIGS. 3 and 4 and a circular cross-section in FIGS. 5 and 6. The mounting section 126 may be removably attached to the apparatus 100 of the present invention. In some embodiments, the first end 103 of the apparatus 100 is removably attached to the mounting section 126. More specifically, the mounting section 126 may be removably attached to one or more projections 118 of the apparatus 100. In preferred embodiments, the removable attachment is carried out via bolts 124. Accordingly, the mounting section 126 may be bolted to the first end 103.

The first end 103 may have a circular or round cross-section, which allows for differently configured and/or rotationally differentiated mounting of the mounting section 126. However, first ends of any shape may be used without departing from the scope of the invention. As noted above, the mounting section 126 is typically connected to a trailer by any means known in the art, now or in the future. In some embodiments, the apparatus 100 may be connected to a pin box (not pictured) rather than a connecting tube. Moreover, the apparatus 100 of the present invention may connect to a trailer (or vehicle) by any means known in the art, now or in the future, without departing from the scope of the invention.

Referring again to FIG. 1, any number or shape of projections 118 may be used. In the preferred embodiment, four projections 118 are employed. The projections 118 may have a flat top 107 and rounded corners 120. Valleys 122 may be located between the projections 118. In the illustrated, preferred embodiment, the valleys 122 are saddle-shaped and are tapered toward the top of the valley 122. The valleys may also be referred to as arcuate in shape.

Figure 3:
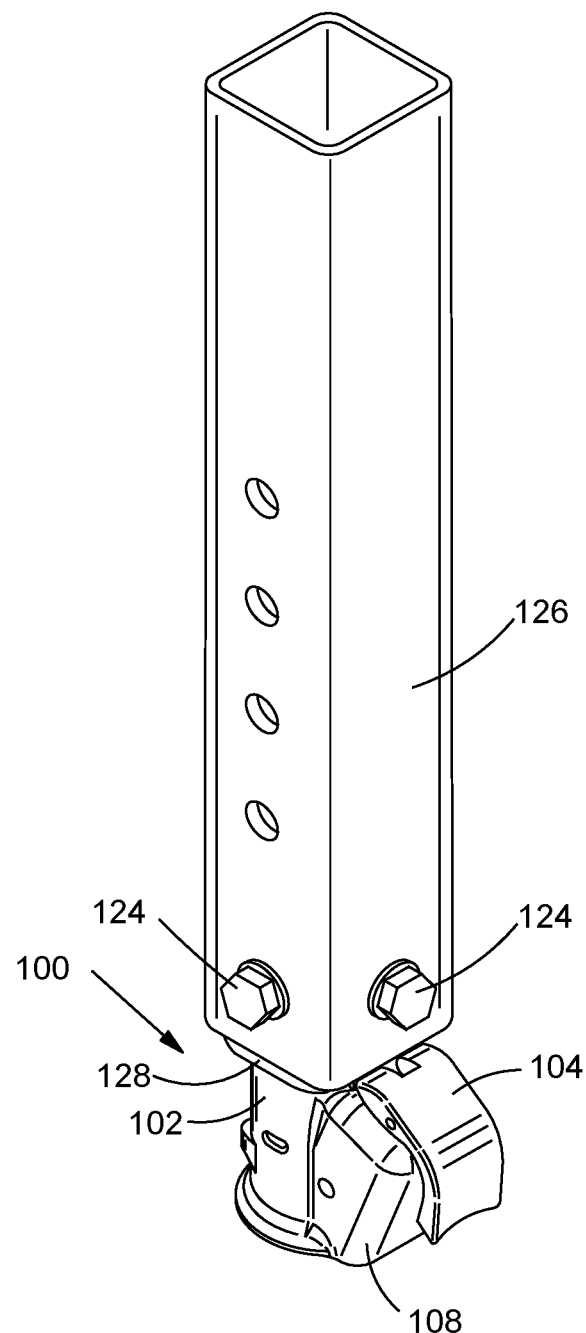
FIG. 3 is a perspective view of a ball hitch coupler of the present invention attached to a mounting section having a square cross-section.

As shown in FIGS. 3-6, the mounting section 126 is secured to the first end 103 of the apparatus 100 via a removably attachable fastener 124, such as a bolt, rather than a permanent attachment means, such as welding. The removably attachable fastener 124 allows the apparatus 100 to be reconfigured at any time, including during manufacture, prior to sale, after sale, during use, between uses, and/or at any other desired time to accept a different style of mounting section 126. Therefore, a retail outlet need not stock entire units of couplers which would have previously been permanently connected to mounting sections 126, such as tubes. Rather, the retail outlet may separately stock a single apparatus 100 that may then be attached to various mounting sections 126 as end users need and/or desire. Accordingly, all parties involved in the manufacture, sale, and/or use of the ball hitch coupler 100 can build and inventory units with more versatility. Moreover, the apparatus 100 offers adaptability that has not previously been found in the art. As shown in FIGS. 3 and 5, some mounting sections 126 have a square profile, while as shown in FIGS. 4 and 6, some mounting sections 126 have a round profile. Moreover, some mounting sections may be a pin box with either a square or circular connection point. The same apparatus 100 can be attached to more than one type of mounting section 126 or device.

The design of the apparatus 100 first section 103 is distinct and allows for the use of removably attachable fasteners 124. As noted above, the first end 103 includes one or more projections 118 and one or more valleys 122. In the preferred embodiment, the projections 118 have a rounded square shape with flat tops 107. The projections 118 may also have a chamfered outside edge 109. The valleys 122 may be saddle-shaped with a tapered profile, such as tapering towards the top of the apparatus 100. The apparatus 100 is configured to form at least one friction contact area with the interior surface of the mounting section 126. In the preferred embodiment, the projections 118 are configured to form said friction contact area. This design provides the strength needed to avoid welding the apparatus 100 to the mounting section 126 (for example the illustrated tube) and also provides for less binding upon initial contact between the apparatus 100 and mounting section 126. Namely, the design is somewhat flexile, allowing for squeeze and friction to provide sufficient strength to the device when the apparatus 100 and the mounting section 126 are affixed using the fasteners 124. Where the first end 103 and mounting section 126 meet each other, there are friction contact areas, also referred to in the art as surface friction points. These increase the strength between the apparatus 100 and mounting section 126. Preferably, the friction contact areas are at the fastening positions 123 between the first end 103 and the mounting section 126, in other words, where the projections 118 accept the fastener 124 via the fastening position 123. As the removably attachable fasteners 124, such as bolts, are tightened, the projections 118 are allowed to move outward towards the mounting section 126. Accordingly, the projections 118 meet the interior surface of the mounting section 126 to create the friction fit and/or squeeze that provides the necessary strength so as to prevent the need for further strengthening (such as welding).

The valleys 122 may include an angled or tapered profile, which aids in fitting the mounting section 126 onto the first end 103 and in the above squeeze/friction fit. Furthermore, the apparatus 100 includes a collar or flange 128 which provides a hard stop between the mounting section 126 and apparatus 100, which is a safety mechanism in the case of a catastrophic failure of the device. Moreover, because the projections 118 can flex to fit the mounting section 126, angular and non-angular slip between the ball hitch coupler 100 and removable connecting tube 126 is reduced and/or eliminated. This further reduces and/or eliminates failure.

Accordingly, the distinct design of the device uses friction and fastener strength over and above the welded devices of the prior art. Moreover, the design of the device provides back-up mechanisms in the case of failures, including catastrophic failures, that are not possible from the welded devices of the prior art. It is unexpected that removably attachable fasteners 124, such as bolts, can be used to replace welding in this device. Specifically, in the past, using bolts (and similar attachment devices) was excluded because they did not create a full seal between the apparatus 100 and the mounting section 126. The bolt acted as a retaining pin rather than providing a clamping force. However, the distinct design of the present invention creates clamping force, which allows one or more removably attachable clamping style fasteners to be used, such as one or more bolts.

Figure 7:
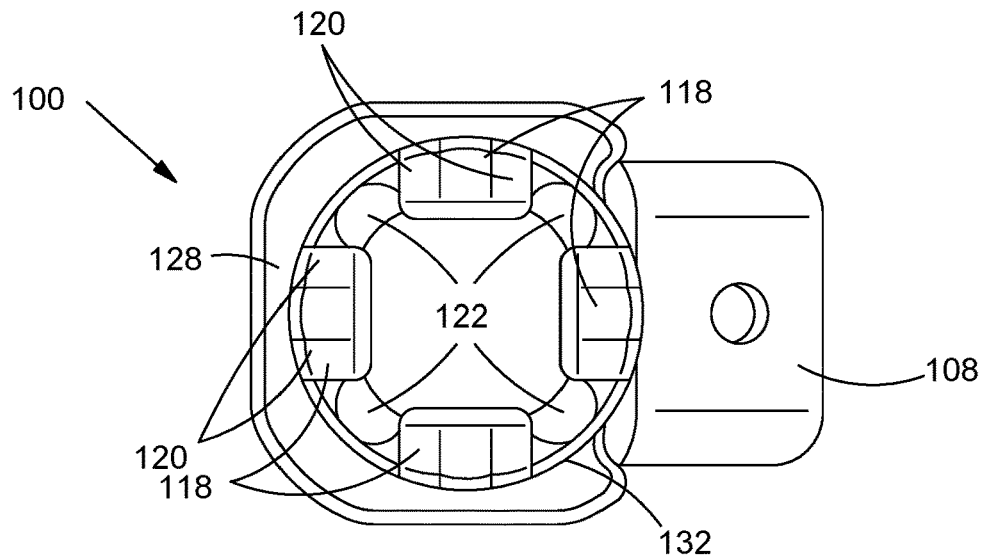
FIG. 7 is a plan view from the top of the ball hitch coupler of FIG. 1 without a removable mounting section attached.

Referring to FIGS. 5 and 6, the friction fit of the present invention is shown. The two figures provide top down plan views of the apparatus 100 attached to a mounting section 126 having a square cross-section in FIG. 5 and a circular cross-section in FIG. 6. Among other features, shown in both figures are the projections 118, valleys 122, and mounting section 126. The projections 118 include rounded corners 120 and a flat top 107. The valleys 120 are saddle-shaped and taper towards the top of the apparatus 100. The mounting section 126 includes an interior surface 130. The fasteners 124 are illustrated as bolts. In preferred embodiments, the aperture may include threading, which makes a separate nut or other structure to receive the bolt unnecessary. Of course, as one of skill in the art will understand, different assemblies may be used without departing from the scope of the invention. Also shown in FIGS. 5 and 7 is the flange 128 upon which the mounting section 126 may rest. The fasteners 124 travel through the first end 103 and more specifically through the projections 118 to attach the first end 103 to the mounting section 126. Accordingly, the exterior surface 132 of the first end 103 meets or touches the mounting section 126 interior surface 130 at one or more locations. Said one or more locations may include, but are not limited to, the fastening positions 123. Said one or more locations may also be the friction contact areas described above. Accordingly, the fastening position(s) 123 may include the friction contact area(s). The mounting section 126 may encapsulate all or a portion of the first end 103. As shown in FIG. 5, when the mounting section 126 has a square cross-section, only a portion of the interior surface 130 of the mounting section 126 may meet the exterior surface 132 of the first end 103. This is true of some other shapes, also. As a reminder, the apparatus 100 may include any number of projections 118 as required for the particular application. Referring to FIG. 6, the when the cross-section of the mounting section 126 is a circle, the entire interior surface 130 of the mounting section 126 may meet the exterior surface 132 of the first end. However, even in applications wherein the cross-section of the mounting section 126 is a circle, it is not required that the entire perimeter of the interior surface 130 meet the exterior surface 132 of the first end 103. To that end, in practice, the size of the apparatus 100 and more specifically the first end 103 will often need to be small enough to fit in mounting sections of smaller diameters but large enough to form a tight connection with the interior surfaces 130 of mounting sections of larger diameters. It is also desirable if the projections 118 can flex without too much stress. The disclosed shape, in particular the combination of projections and valleys, will give the apparatus 100 the necessary strength and also allow for the required flex. A first end 103 having a solid configuration may result in increased stress, including increased stress at the fastening positions 123. In some tests, the stress affected zone is larger and the top stress is 30% higher with a solid configuration than the configuration shown in the figures. The illustrated configuration provides relief that creates a firm connection with the mounting section 126 interior surface 130 that allows the stress to be shared with the apparatus. As shown above, in some tests, this results in a 30% lower stress point, although the value may be different in different applications and/or configurations.

Turning to FIG. 7, a top plan view of the apparatus 100 without a mounting section 126 is shown. Shown are the projections 118 having rounded corners 120 and the valleys 122. The flange 128 is shown. Lastly, the first section 103 exterior surface 132 may also be seen.

Figure 9:
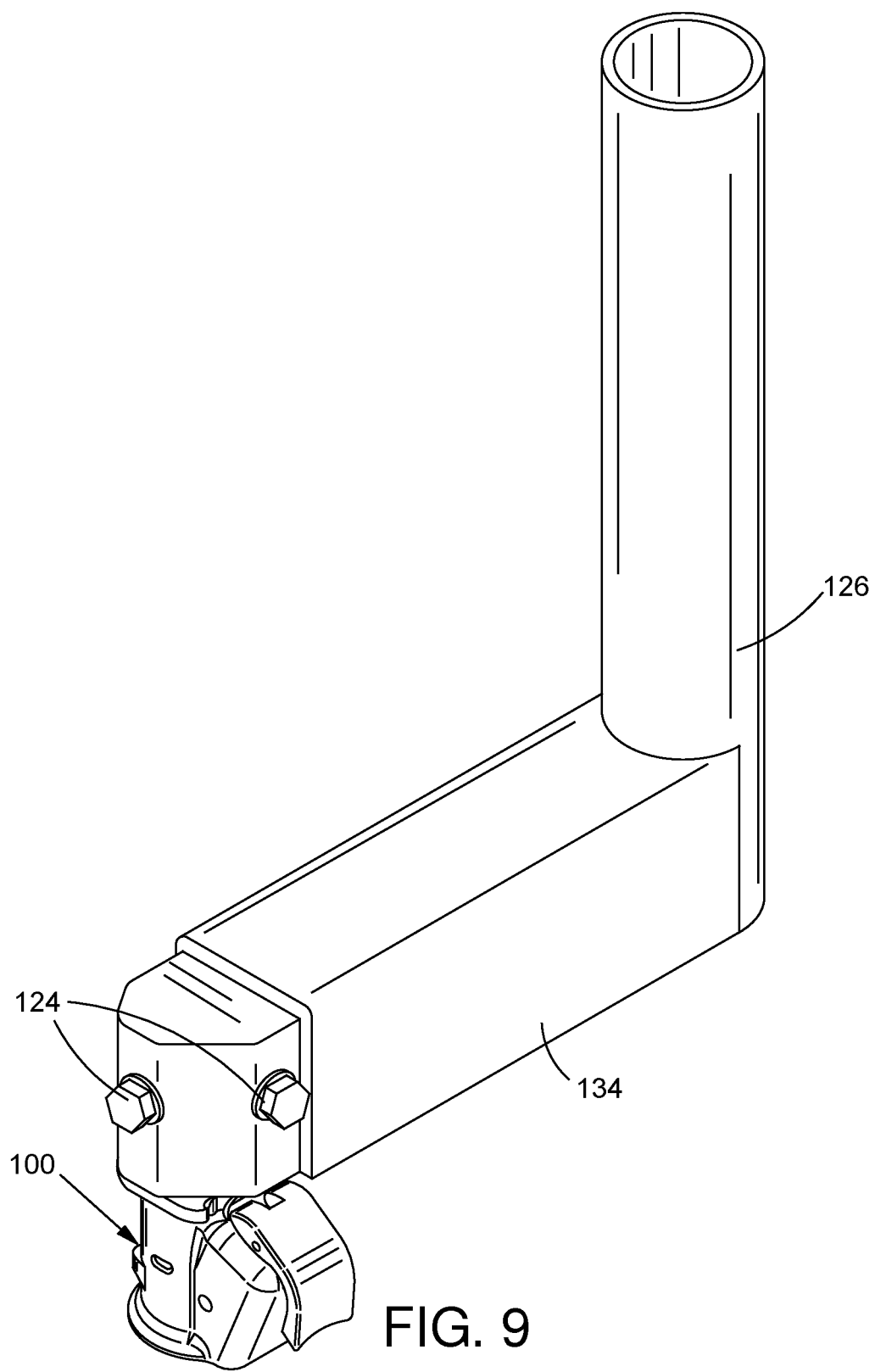
FIG. 9 is a perspective view of another embodiment of the apparatus wherein the apparatus is offset from the mounting section via an offset section.

FIG. 9 illustrates another embodiment of the apparatus 100 wherein the apparatus 100 and the mounting section 126 are separated by an offset portion 134, which provides for even greater flexibility when configuring the apparatus 100 in various applications.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements, and/or substantial equivalents.

The invention claimed is:

1. An apparatus comprising:
a first end including a plurality of projections having fastening positions, said projections configured to be removably attached to a mounting section of a vehicle to be towed;
said projections configured to form a friction contact area with the interior surface of said mounting section upon attachment, wherein said fastening positions further comprise an aperture; and
a second end including a hitch portion.

2. The apparatus of claim 1 comprising four projections.

3. The apparatus of claim 1 wherein said projections have rounded corners.

4. The apparatus of claim 1 wherein said projections have flat ends.

5. The apparatus of claim 1 wherein the space between the projections is arcuate in shape.

6. The apparatus of claim 1 further comprising a flange, said flange configured to support said mounting section.

7. The apparatus of claim 1 wherein said projections are configured to removably attach to mounting sections having a variety of cross-sectional shapes.

8. The apparatus of claim 7 wherein one of said cross-sectional shapes is a circle.

9. The apparatus of claim 7 wherein one of said cross sectional shapes is a square.

10. The apparatus of claim 1 wherein said mounting section is a trailer tube.

11. The apparatus of claim 1 wherein said mounting section is a trailer pin box.

12. An apparatus for connecting a ball hitch coupler to a mounting section of a trailer comprising:
a first end comprising a connecting portion having four projections separated by arcuate shaped valleys;
said projections configured to be removably attached to the inner surface of said mounting section via fasteners exerting a clamping force between said projections and said mounting section;
said projections configured to form a friction contact area with said interior surface of said mounting section;
a second end including a hitch portion; and
a flange positioned below the projections.

13. The apparatus of claim 12 wherein said saddle-shaped valleys are tapered towards the top.

14. The apparatus of claim 12 wherein said projections have rounded corners.

15. The apparatus of claim 14 wherein the projections create a friction fit between said connecting portion and said mounting section when removably fixed to said mounting section.

16. The apparatus of claim 12 wherein said mounting section is a trailer tube.

17. The apparatus of claim 12 wherein said mounting section is a trailer pin box.

* * * * *